US008848263B2

(12) United States Patent
Takahashi

(10) Patent No.: US 8,848,263 B2
(45) Date of Patent: Sep. 30, 2014

(54) IMAGE READING APPARATUS

(71) Applicant: Canon Kabushiki Kaisha, Tokyo (JP)

(72) Inventor: Masafumi Takahashi, Noda (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/915,920

(22) Filed: Jun. 12, 2013

(65) Prior Publication Data

US 2013/0342882 A1    Dec. 26, 2013

(30) Foreign Application Priority Data

Jun. 22, 2012 (JP) ................................ 2012-140853

(51) Int. Cl.
*H04N 1/04* (2006.01)
(52) U.S. Cl.
USPC ........... 358/498; 358/474; 358/497; 358/496; 271/10.01; 271/145; 399/110
(58) Field of Classification Search
CPC . H04N 1/12; H04N 1/00045; H04N 1/00572; H04N 1/00588; H04N 1/047; H04N 1/121; H04N 1/0057; H04N 2201/04755; H04N 1/00615
USPC ........ 358/498, 474, 497, 1.13, 461, 488, 448, 358/463, 496; 271/10.01, 145, 147, 18, 271/314, 4.02; 399/110
See application file for complete search history.

(56) References Cited

U.S. PATENT DOCUMENTS

| | | | |
|---|---|---|---|
| 7,391,540 B2* | 6/2008 | Chen | 358/474 |
| 7,561,315 B2* | 7/2009 | Hiraoka et al. | 358/498 |
| 7,633,653 B2* | 12/2009 | Nishizawa et al. | 358/461 |
| 7,986,445 B2* | 7/2011 | Carlson et al. | 358/474 |
| 8,018,632 B2* | 9/2011 | Walker et al. | 358/498 |
| 8,144,374 B2* | 3/2012 | Taniguchi | 358/474 |
| 8,259,366 B2* | 9/2012 | Hayakawa et al. | 358/497 |
| 8,300,280 B2* | 10/2012 | Lee et al. | 358/474 |
| 8,300,287 B2* | 10/2012 | Aharonson | 358/496 |
| 8,335,021 B2* | 12/2012 | Tanaka et al. | 358/461 |
| 8,405,889 B2* | 3/2013 | Cui et al. | 358/496 |
| 8,451,514 B2* | 5/2013 | Huang | 358/488 |

FOREIGN PATENT DOCUMENTS

| | | |
|---|---|---|
| JP | 62-183258 A | 8/1987 |
| JP | 3-191662 A | 8/1991 |
| JP | 2502512 B2 | 5/1996 |

(Continued)

OTHER PUBLICATIONS

Combined Search and Examination Report, Application No. GB1311118.2, dated Dec. 16, 2013, Intellectual Property Office of the United Kingdom.

*Primary Examiner* — Negussie Worku
(74) *Attorney, Agent, or Firm* — Fitzpatrick, Cella, Harper & Scinto

(57) ABSTRACT

Disclosed is an image reading apparatus comprising: a movable unit having a transparent member; a guide portion arranged to face the transparent member to guide a conveyed sheet; a reader portion configured to read an image on a sheet guided by the guide portion past the transparent member; abutting portions that are provided on the guide portion and abut on the movable unit; an actuating portion configured to move the movable unit in a direction along the surface of the transparent member; and an engaging portion provided on the movable unit and engaged with the guide member such that the movable unit and the abutting portion are separated from each other as the movable unit is moved by the actuating portion.

9 Claims, 8 Drawing Sheets

(56) References Cited

FOREIGN PATENT DOCUMENTS

| | | |
|---|---|---|
| JP | 10-098580 A | 4/1998 |
| JP | 2008-199213 A | 8/2008 |
| JP | 2011-223226 A | 11/2011 |
| JP | 4891109 B2 | 3/2012 |

* cited by examiner

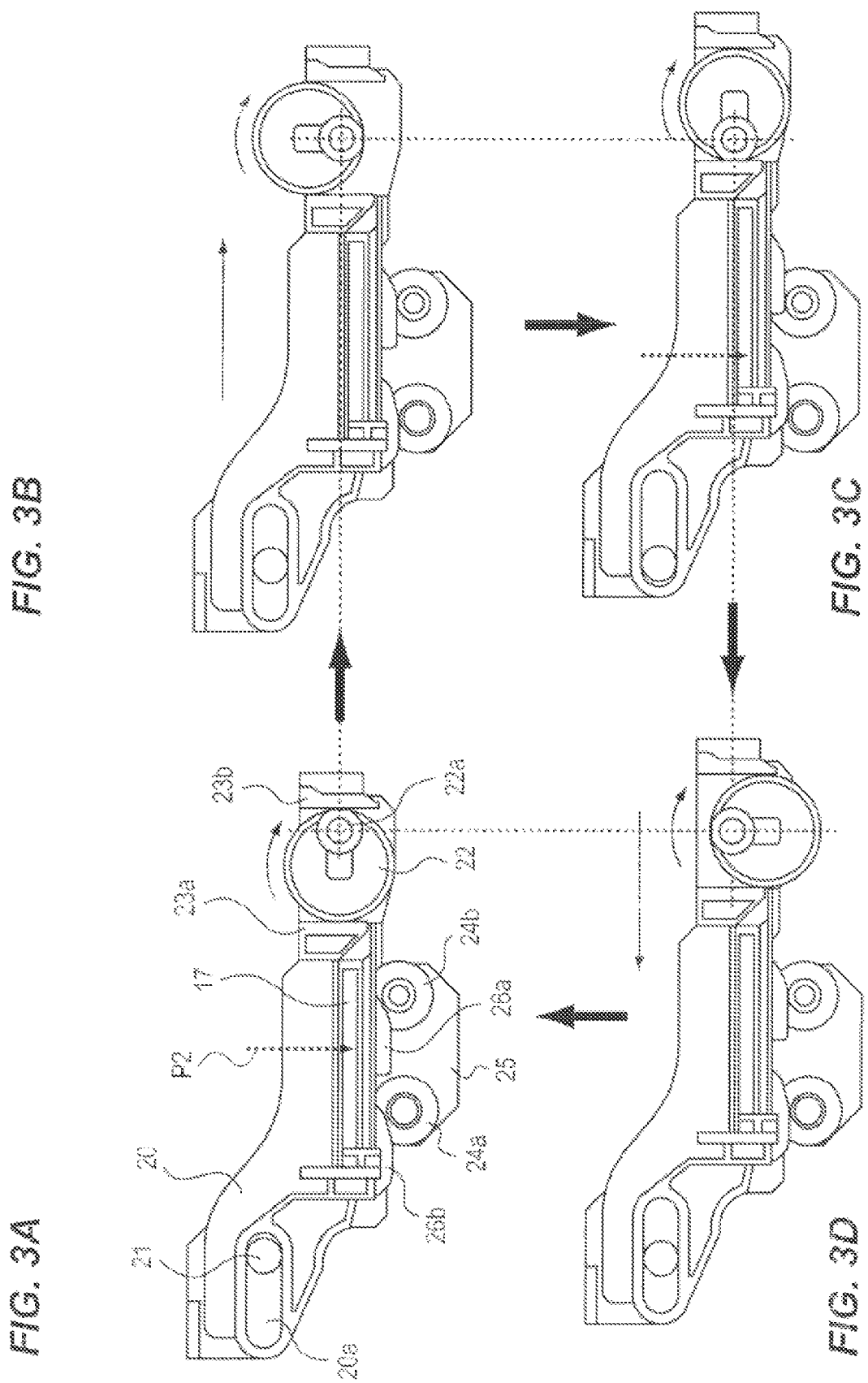

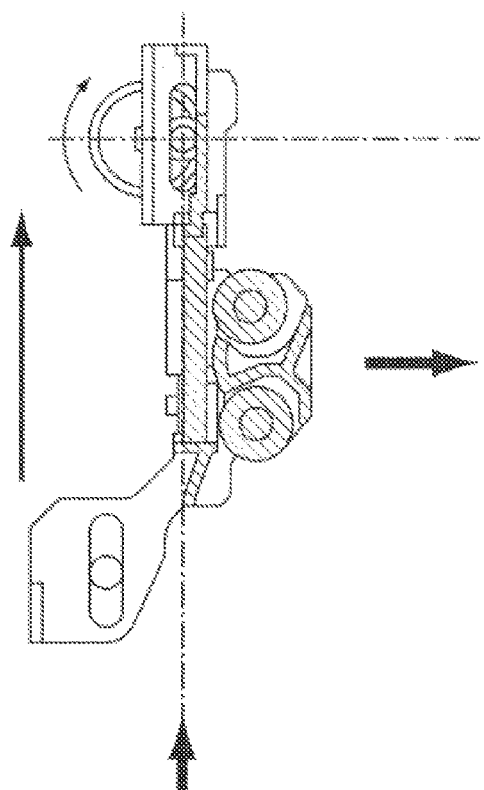
FIG. 4A
FIG. 4B
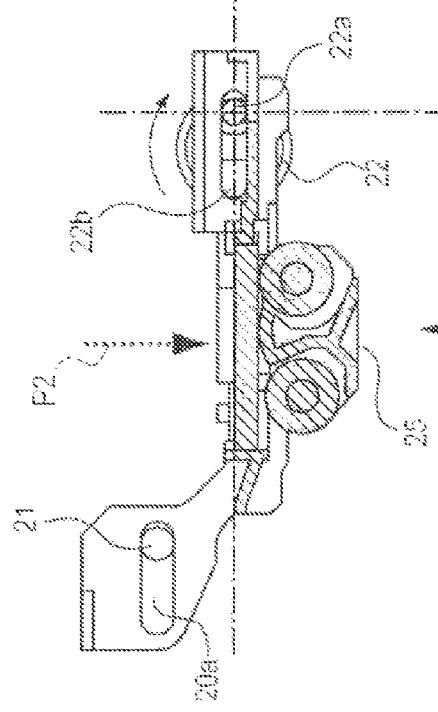
FIG. 4D
FIG. 4C
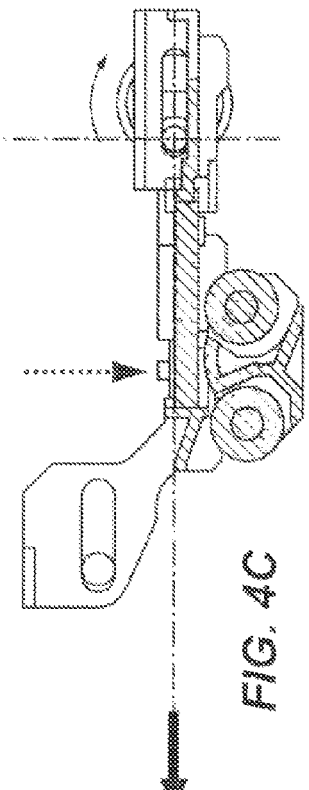
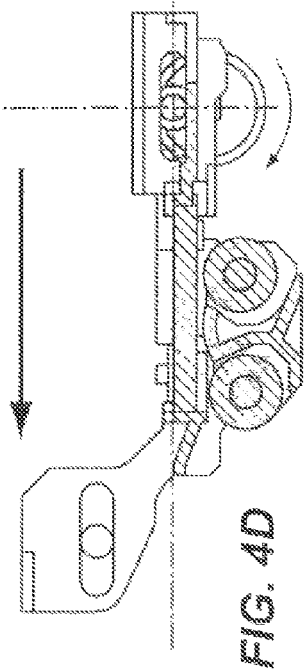

ABUTTING STATE

SEPARATED STATE

ABUTTING STATE

SEPARATED STATE

IMAGE READING APPARATUS

BACKGROUND OF THE INVENTION

1. Field of the Invention

The present invention relates to an image reading apparatus configured to optically read an original.

2. Description of the Related Art

In the related art, an image reading apparatus configured to convey and read an original is used to perform image reading of the original. Specifically, a motor is driven to move and stop a reader portion nearly directly under a reading position. Then, light is irradiated from a lamp unit, and the originals stacked on the original tray are separated one by one and are conveyed along a glass member that supports the original in the reading position. In addition, the original is optically scanned over the glass member, and reflection light thereof is read by the reader portion, so as to obtain image data. Meanwhile, there is known a technique of reading both sides of the original by arranging reader portions in both sides of an original conveyance path and conveying the original once without reversing the original (Japanese Patent Laid-Open No. 2008-199213).

In such an image reading apparatus, it is necessary to perform shading correction on a regular basis by correcting unevenness of a density level generated by a characteristic of an image pickup element, an influence of lens aberration, and the like in order to constantly maintain an image reading precision.

In an image reading apparatus in the related art, in order to perform shading correction of the reader portion, a glass member to which a white reference member is attached moves such that the reader portion faces the white reference member, and the white reference is read.

In the apparatus that optically reads an image as described above, if the original supported by the glass member in the image reading position is uplifted or rattled, it is difficult to perform reading with a high precision. For this reason, a guide portion or a subsidiary conveyance roller that presses the original to the glass member in the image reading position is provided. However, it is necessary to position such an element with respect to the glass member with a high positional precision. In this regard, the positioning is performed by causing the guide member and the like to abut on the glass member.

However, if the guide member or the like abuts on the glass member, the guide member and the glass member may rub together and wear out when the glass member moves in a case where shading correction is performed as described above. As a result, the positional precision may be degraded.

SUMMARY OF THE INVENTION

In view of the problems described above, it is desirable to provide an image reading apparatus capable of improving integrity of the guide member with a simple and easy configuration.

According to an aspect of the present invention, an image reading apparatus comprising: a movable unit having a transparent member; a guide portion arranged to face the transparent member to guide a conveyed sheet; a reader portion configured to read an image on a sheet guided by the guide portion past the transparent member; an abutting portion that is provided on the guide portion and abuts on the movable unit; an actuating portion configured to move the movable unit in a direction along the surface of the transparent member; and an engaging portion provided on the movable unit and engaged with the guide member such that the movable unit and the abutting portion are separated from each other as the movable unit is moved by the actuating portion.

Further features of the present invention will become apparent from the following description of exemplary embodiments with reference to the attached drawings.

BRIEF DESCRIPTION OF THE DRAWINGS

FIG. 3A is a diagram illustrating movement of a glass member.

FIG. 3B is a diagram illustrating movement of the glass member.

FIG. 3C is a diagram illustrating movement of the glass member.

FIG. 3D is a diagram illustrating movement of the glass member.

FIG. 4A is a diagram illustrating movement of a glass member.

FIG. 4B is a diagram illustrating movement of the glass member.

FIG. 4C is a diagram illustrating movement of the glass member.

FIG. 4D is a diagram illustrating movement of the glass member.

DESCRIPTION OF THE EMBODIMENTS

Hereinafter, an image reading apparatus according to an embodiment of the present invention will be described in detail with reference to the accompanying drawings.

<Configuration of an Image Reading Apparatus>

Figure 1:
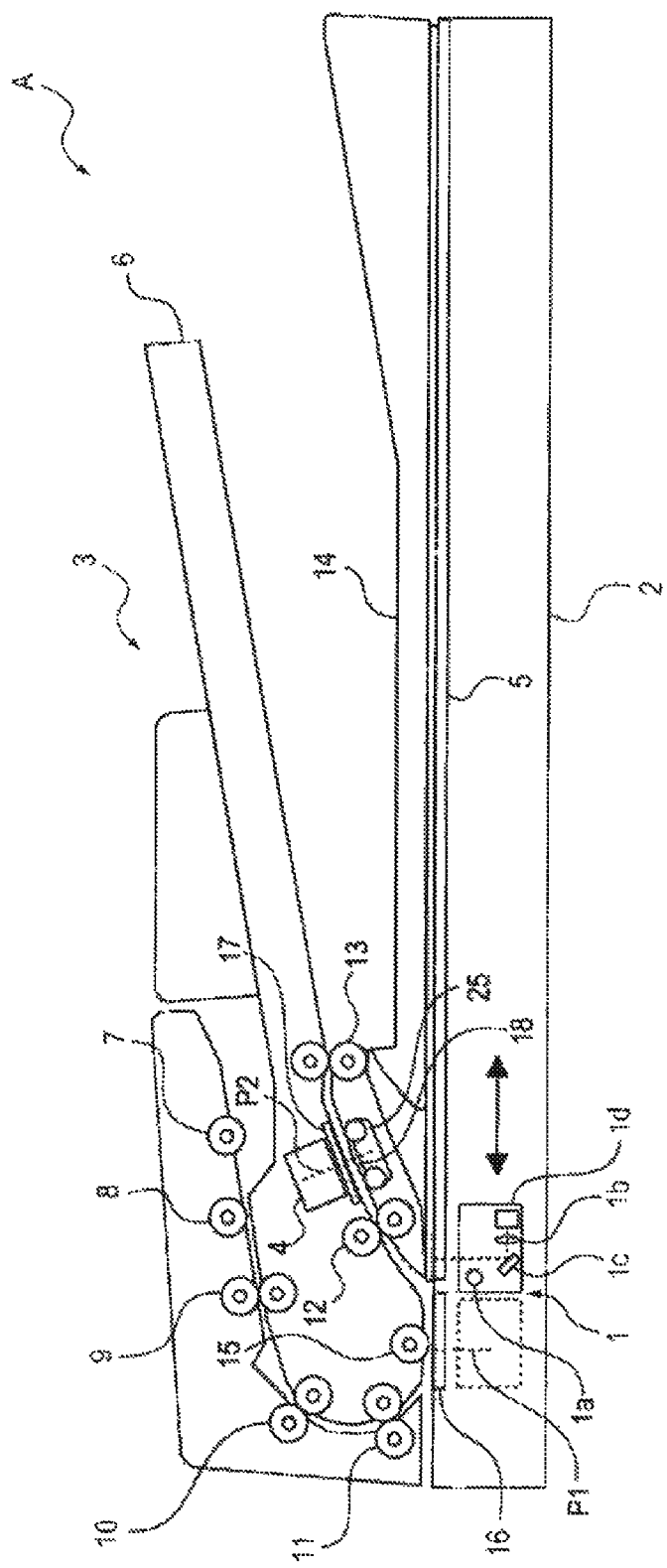
FIG. 1 is a schematic front cross-sectional view illustrating an image reading apparatus.

As illustrated in FIG. 1, the image reading apparatus A according to the present embodiment includes a scanner body 2 having a first image reader portion 1 configured to read an image on an original sheet (hereinafter, referred to as an "original") from the bottom and a conveying portion 3 configured to convey the original. In addition, a second image reader portion 4 is also provided in the conveying portion 3. As a result, a front face of the original is read by using the first image reader portion 1, and a rear face of the original is read by using the second image reader portion 4 without reversing the original while the original is conveyed by the conveying portion 3.

As illustrated in FIG. 1, the first image reader portion 1 includes a lamp 1a configured to irradiate light onto an image surface of the original, a mirror 1c configured to guide, to a lens 1b, the light irradiated from the lamp 1a and reflected off the original, and a charge coupled device (CCD) 1d serving as a reading sensor. The first image reader portion 1 is combined with a motor (not illustrated) through a wire (not illustrated) so as to reciprocate in parallel with an original base plate glass 5 by virtue of rotational driving of the motor. In this case, the original placed on the original base plate glass 5 is optically sacnned.

The scanner body 2 is able to read the original in any one of modes such as a flat-bed scan mode and an automatic document feeder (ADF) scan mode selected by a user.

In the flat bed scan mode, a user uplifts a near side of an openable/closable conveying portion 3 hinged against the scanner body 2 to open an upper face of the scanner body 2 and places the original on the exposed original base plate glass 5. Then, as a scan key is manipuated, the first image reader portion 1 moves to read the original.

Meanwhile, in the ADF scan mode, a user sets the original on an original tray 6 and operates the scan key. Then, the originals are separately conveyed one by one through a pickup roller 7, a separating roller 8, and conveying rollers 9, 10, and 11 constituting the conveying unit, pass through a reading position P1 of the original base plate glass 5, and are discharged to a discharge tray 14 through conveying rollers 12 and 13. In this case, the original is read by the first image reader portion 1 that is disposed under the reading position P1. It is noted that a platen roller 15 is installed in a position facing a first glass member 16 to prevent the original from floating or deviating from the reading position P1.

In the ADF scan mode, if a double-sided scan mode is executed, an image on a front face is read by the first image reader portion 1, and an image on a rear race is read by the second image reader portion 4 having a lamp, a mirror, a lens, a CCD, and the like, similar to the first image reader portion 1, when the original passes through a gap between the conveying rollers 12 and 13. For this purpose, a second glass member 17 is provided as a support member that supports the original conveyed by the second image reader portion 4 in the reading position P2. Furthermore, in order to prevent the original from floating or deviating from the reading position P2, a conveyance guide unit 25 having a guide member 18 that guides the conveyed original to a position facing the second glass member 17 is provided. The second image reader portion 4 reads the image on the original by optically scanning, through the second glass member 17, the original guided and conveyed by the guide member 18 along a lower face of the second glass member 17 coresponding to a transparent member. Since the image reading apparatus A includes the first and second image reader portions 1 and 4, it is possible to read a double-sided image without reversely conveying the original.

In the apparatus configured to optically read an image as described above, it is necessary to perform so-called shading correction, in which degradation of sensitivity or the like of an original illumination lamp and a CCD is corrected on a regular basis in order to perform image reading with an excellent image quality. In the first reading position, a first white reference portion (not illustrated) serving as a white reference color for performing the shading correction is provided in an upstream side of the original conveying direction of the original base plate glass 5. Since the first image reader portion 1 is movably provided, the first image reader portion 1 moves to the position of the white reference portion and reads the white reference to perform the shading correction at the time of shading correction.

Meanwhile, in the second reading portion, the second image reader portion 4 as a reader is fixed. Therefore, it is difficult to move the second image reader portion 4. For this reason, a second white reference portion 19 (refer to FIGS. 2A and 2B) serving as a white reference is provided in the second glass member 17, and the second glass member 17 is configured movably in a direction parallel to a front face of the second glass member 17 relative to the second image reader portion 4.

<Configuration for Moving Second Glass Member>

Figure 2A:
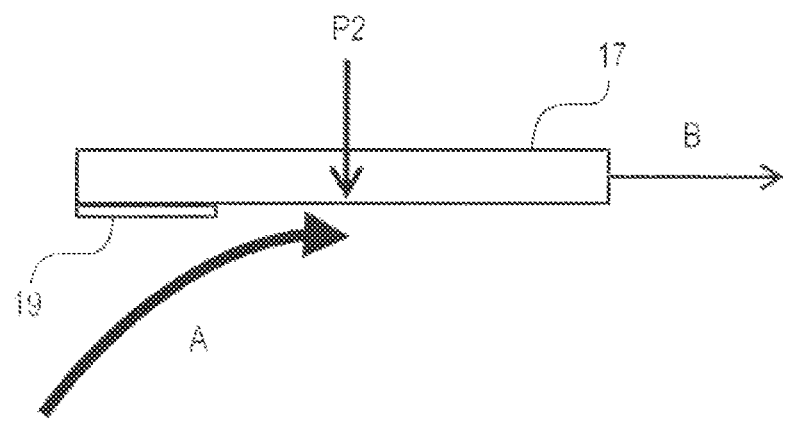
FIG. 2A is a diagram illustrating movement of a glass member.
Figure 2B:
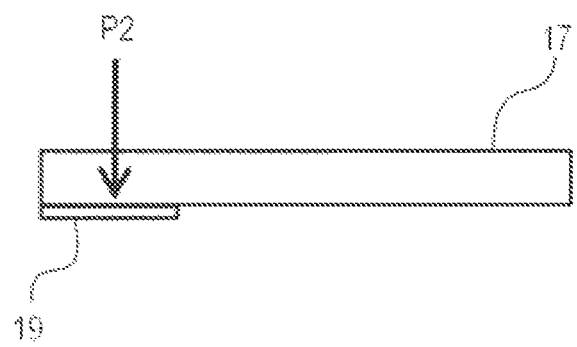
FIG. 2B is a diagram illustrating movement of the glass member.

Next, a configuration for moving the aforementioned second glass member 17 will be described with reference to FIGS. 2A to 4D. FIG. 2A illustrates a case where the second glass member 17 is placed in the image reading position, and FIG 2B illustrates a case where the second glass member 17 is placed in the shading correction position for performing shading correction.

As illustrated in FIG. 2A, the second white reference portion 19 for performing shading correction is attached to the original conveyance surface side of the second glass member 17. In order to read the original, the original is conveyed in the arrow direction A, and the image is read when the original passes through the reading position P2. In this case, the second white reference portion 19 is placed in a retracted position displaced away from the reading position. Meanwhile, in order to perform shading correction, the second glass member 17 moves in the arrow direction B of FIG. 2A, which is a direction along a front face of the second glass member 17, and the second white reference portion 19 moves to the reading position P2 (refer to FIG. 2B).

FIG. 3A illustrates a state that the second glass member 17 is placed in the image reading position, FIG. 3B is an explanatory diagram illustrating a state that the second glass member 17 moves from the image reading position to the shading correction position, and FIGS. 4A and 4B are explanatory cross-sectional views in each position. FIG. 3C is an explanatory diagram illustrating the shading correction position, FIG. 3D is an explanatory diagram illustrating a state that the second glass member 17 moves from the shading correction position back to the reading position, and FIGS. 4C and 4D are explanatory cross-sectional views illustrating each position.

As illustrated in FIGS. 3A to 3D, and 4A to 4D, the second glass member 17 is held in a glass holder 20. According to the present embodiment, the second glass member 17 and the glass holder 20 constitute a glass unit serving as a movable unit including the second glass member 17 corresponding to a transparent member. In the glass holder 20, long holes 20a and 20b are formed in the upstream and downstream ends, respectively, of the original conveying direction. A pin 21 provided with the apparatus body is inserted into the long hole 20a of the upstream end. A rotational shaft 22a of a glass movement cam 22 rotatably provided in the apparatus body is inserted into the long hole 20b of the downstream end. As a result, the glass holder 20 is movably supported within the ranges of the long holes 20a and 20b along with the second glass member 17.

The glass holder 20 is provided with first and second contact portions 23a and 23b where the glass movement cam 22 rotated by a motor abuts. The first contact portion 23a makes contact with the glass movement cam 22 from the side opposite to the second contact portion 23b in the movement direction of the second glass member 17. That is, the first and the second contact portions 23a and 23b are arranged to nip the glass movement cam 22. In addition, as the motor rotates in a certain direction, the glass movement cam 22 rotates with respect to the rotational shaft 22a. The glass movement cam 22 is a so-called eccentric cam having the rotational shaft 22a as a rotation center eccentric from the center of the outer circumference (cam surface).

As the glass movement cam 22 rotates, the glass holder 20 slides in the original conveying direction, and the second glass member 17 moves between the image reading position and the shading correction position. According to the present embodiment, a circular cam is employed as the glass movement cam 22. By rotating the glass movement cam 22 in a single round, the second glass member 17 reciprocates once between the image reading position (position in FIGS. 3A and 4A) and the shading correction position (position in FIGS. 3C and 4C) as indicated by the sequence A→B→C→D of FIGS. 3A to 3D and 4A to 4D. In addition, the second white reference portion 19 is placed in a retracted position when the second glass member 17 is placed in the reading position P2. The second white reference portion 19 moves to the reading position P2 when the second glass member 17 moves to the shading correction position.

Figure 5:
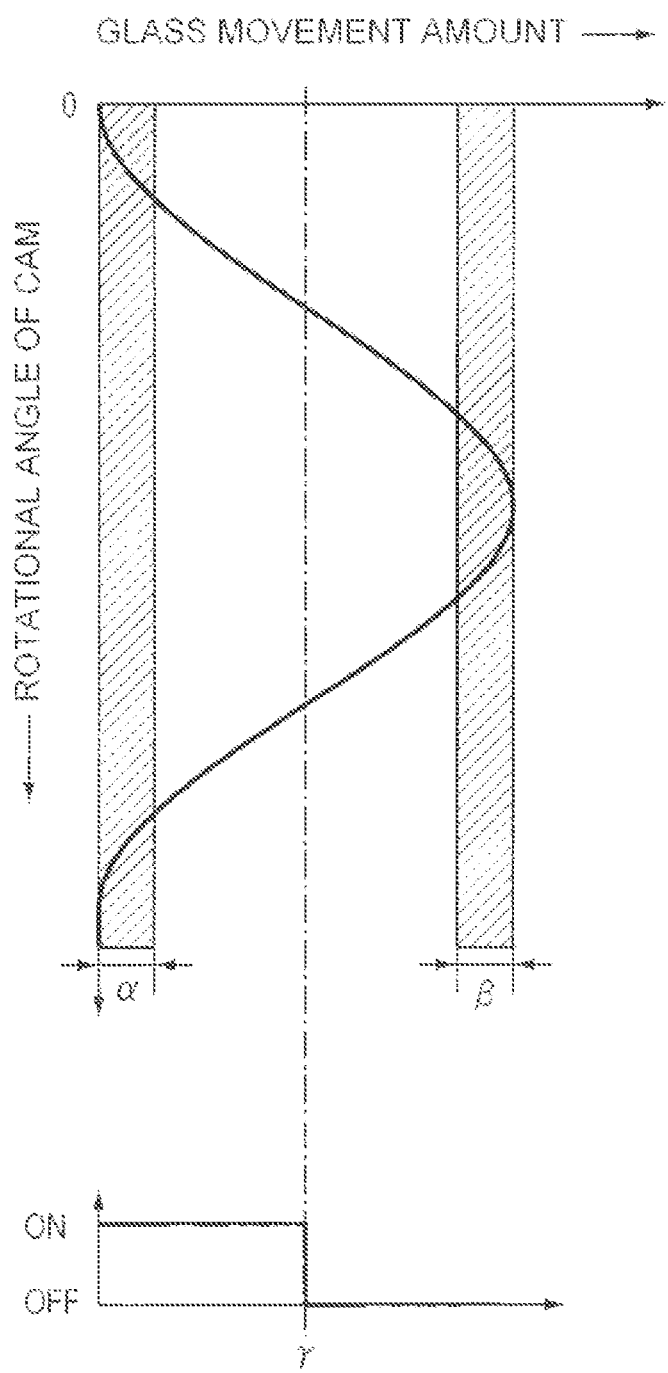
FIG. 5 is a diagram illustrating a detection state of a glass position detection sensor depending on a glass member movement amount.

Since the glass movement cam 22 has a circular shape, driving can be made while a contact surface of the glass movement cam 22 and a contact surface of the glass holder 20 abut on each other at all times in both forward and return paths of the glass movement. For this reason, it is possible to reliably move the glass holder 20 without erroneously stopping the glass holder 20. As illustrated in FIG. 5, even from the viewpoint of the moving velocity of the glass holder 20, a movement amount of the glass holding member against a rotation amount of the glass movement cam 22 decreases in the vicinities of both ends α and β of the movement range. For this reason, advantageously, it is possible to position the second glass member 17 with a high precision by setting the reading position or the shading position in such an area.

In movement control of the second white reference portion 19 to the image reading position and the shading correction position, the second glass member 17 moves to a predetermined position (position γ in FIG. 5), and a detection sensor detects this state. By driving the stepping motor configured to rotate the glass movement cam 22 from the detection position described above for a predetermined pulse, it is possible to accurately move the second glass member 17 to the image reading position or the shading correction position.

<Separating Portion of Conveyance Guide Unit>

Figure 8A:
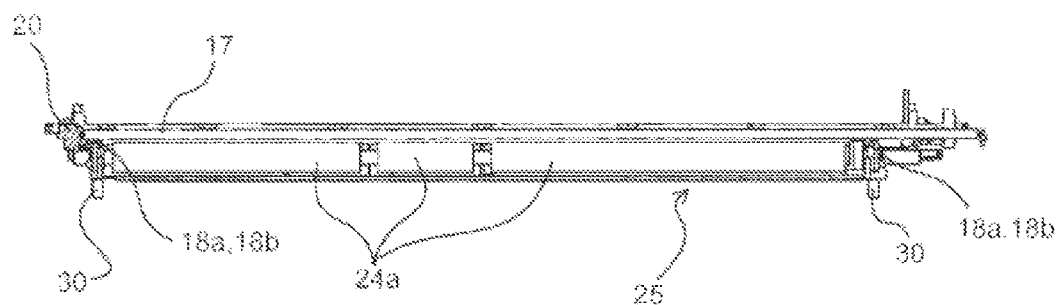
FIG. 8A is a diagram illustrating a configuration of a conveyance guide unit.
Figure 8B:
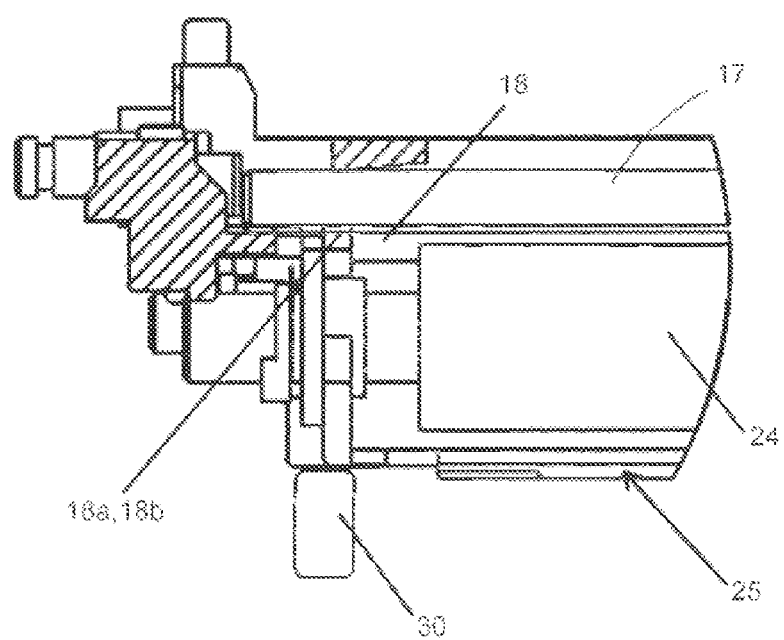
FIG. 8B is a diagram illustrating a configuration of a conveyance guide unit.

The guide member 18 provided in the conveyance guide unit 25 is separated from the second glass member 17 with a predetermined gap. Therefore, when the original is conveyed along a surface of the second glass member 17, an uplift or a rattle of the original is prevented by the guide member 18. This contributes to stable image reading. In addition, since abutting portions 18a and 18b integrated with the guide member 18 abut on the second glass member 17 as illustrated in FIGS. 6, 8A, and 8B, it is possible to guarantee the aforementioned gap and position the guide member 18 with respect to the second glass member 17.

Here, if the abutting portions 18a and 18b still abut on the second glass member 17 in a case where the second glass member 17 moves as described above, both the abutting portions 18a and 18b and the second glass member 17 may easily wear. In this regard, according to the present embodiment, the abutting portions 18a and 18b are separated from the second glass member 17 when the second glass member 17 moves from the reading position P2 for the purpose of shading correction and the like. When the second glass member 17 returns to the reading position P2, the abutting portions 18a and 18b return from the separated state to the abutting state. It is noted that FIG. 6A illustrates the abutting state, and FIG. 6B illustrates a separated state.

Figure 7A:
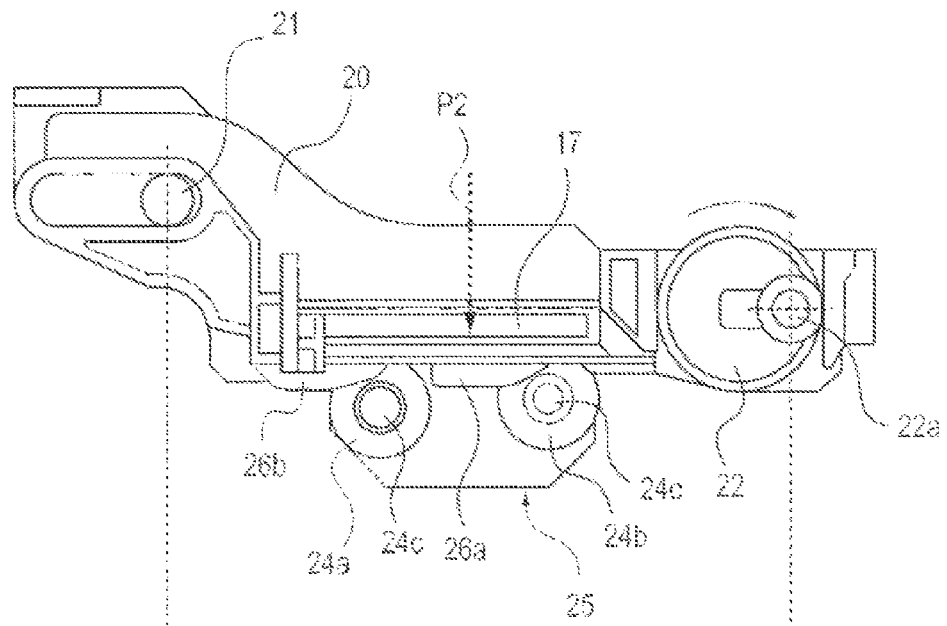
FIG. 7A is a diagram illustrating a separating configuration of conveyance guide unit.
Figure 7B:
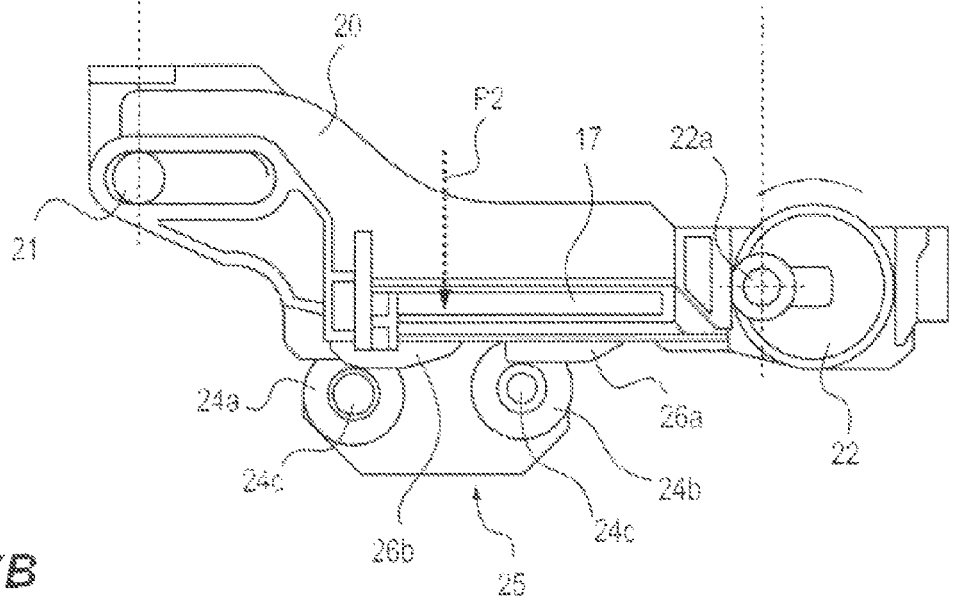
FIG. 7B is a diagram illustrating the separating configuration of the conveyance guide unit.

Next, description will be made for a configuration of the separating portion for separating the abutting portions 18a and 18b from the second glass member 17 or causing the abutting portions 18a and 18b to abut on the second glass member 17 in synchronization with movement of the second glass member 17. FIG. 7A illustrates a positional relationship between the glass holder 20 configured to hold the second glass member 17 in the image reading position P2 and the conveyance guide unit 25 as a guide portion. FIG. 7B illustrates a positional relationship between the glass holder 20 in the shading correction position and the conveyance guide unit 25.

Figure 6A:
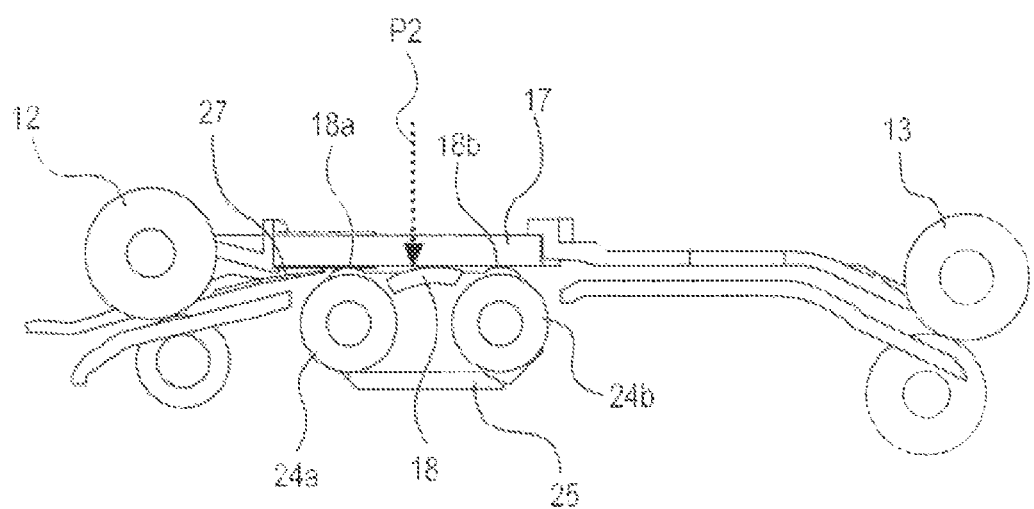
FIG. 6A is a diagram illustrating a separating configuration of a conveyance guide unit.
Figure 6B:
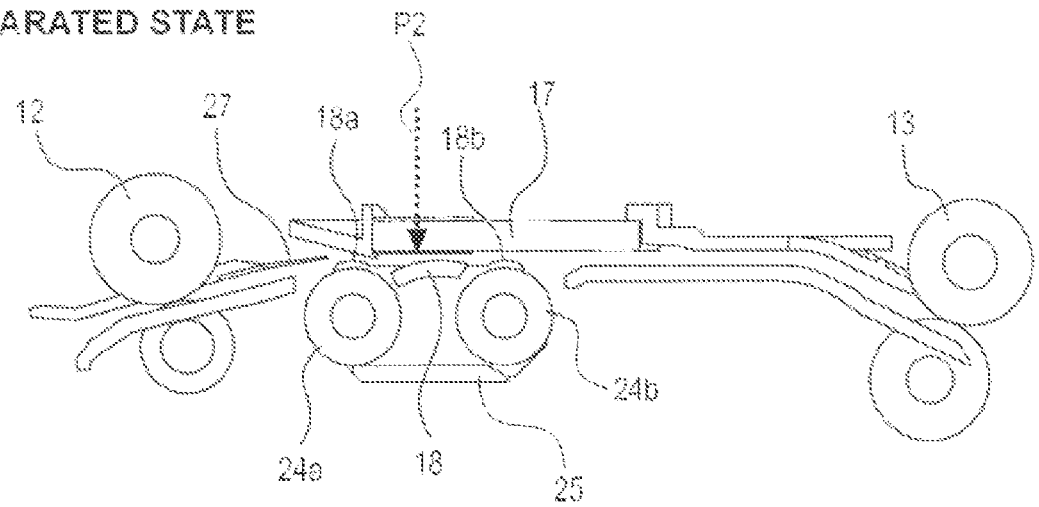
FIG. 6B is a diagram illustrating the separating configuration of the conveyance guide unit.

As illustrated in FIGS. 6A and 6B, the guide member 18 is provided in the conveyance guide unit 25 having guide rollers 24a and 24b rotatably provided to guide the original conveyed in the upstream and downstream sides of the reading position P2. In addition, the abutting portions 18a and 18b provided in the conveyance guide unit 25 can abut on or be separated from the second glass member 17.

The conveyance guide unit 25 is provided vertically movably against the apparatus body in the reading position P2. Therefore, the guide member 18 is movable in synchronization with the guide rollers 24a and 24b. In the reading position P2, the abutting portions 18a and 18b provided at both sides in the original width direction (perpendicular to an original conveying direction), and at upstream and downstream side of the guide member 18 of the original conveying direction, abut on the second glass member 17 and are biased by a pressing member 30 (refer to FIGS. 8A and 8B) so as to press against the second glass member 17 with a predetermined pressure. As a result, it is possible to guarantee a gap between a conveyance guide face of the guide member 18 and the second glass member 17 and a gap between the guide rollers 24a and 24b and the second glass member 17. That is, the abutting portions 18a and 18b are provided outside the original conveyance area (outside the area in the original width direction), and the second glass member 17 abuts on the abutting portions 18a and 18b, so that a gap for passing the original is reliably obtained (guaranteed) between the second glass member 17 and the guide member 18.

Outside the original conveyance area, the glass holder 20 is provided with engaging portions 26a and 26b sloped so as to present a surface that is inclined to the movement direction of the glass holder 20 and can make contact with the shaft of the guide roller as illustrated in FIGS. 7A and 7B. A guide roller shaft 24c of the guide rollers 24a and 24b is pressed down by the slope of the engaging portions 26a and 26b when the glass holder 20 moves from the reading position P2 to the shading correction position. As a result, the guide roller shaft 24c is moved away from the second glass member 17.

While the guide roller shaft 24c as the engaged portion is engaged (contacted) with the engaging portions 26a and 26b provided in the glass holder 20, the conveyance guide unit 25 moes downwardly by virtue of the pressing of the guide roller shaft 24c. In synchronization with this movement, the abutting portions 18a and 18b of the guide member 18 are separated from the second glass member 17 (FIGS. 6B and 7B).

If the shading correction is completed, and the second glass member 17 returns to the reading position P2, the engaging portions 26a and 26b are disengaged from the guide roller shaft 24c, and the abutting portions 18a and 18b abut on the second glass member 17 so as to position the guide member 18 (FIGS. 6A and 7A).

The abutting portions 18a and 18b abut on the second glass member 17 only when the second glass member 17 is placed in the vicinity of the reading position P2. As the second glass member 17 placed in the reading position P2 starts to move, the guide roller shaft 24c is immediately engaged with the slope portions of the engaging portions 26a and 26b so as to initiate separation. For this reason, it is possible to move the second glass member 17 without continuous rubbing between the abutting portions 18a and 18b and the second glass member 17.

As described above, according to the present embodiment, the abutting portions 18a and 18b are separated from the second glass member 17 against the biasing force of the pressing member in synchronization with the movement of the second glass member 17 using the separating portion. Therefore, the abutting portions 18a and 18b provided in the guide member 18 do not wear out. For this reason, it is possible to position the conveyance guide unit 25 with respect to the glass member with a high precision using a simple and easy configuration. On above described embodiment the engaging portion provided the glass holder 20 has a inclined surface that is inclined with respect to the moving direction of the glass holder 20 but it can be formed that the engaged portion provided on the conveyance guide unit 25 has a inclined surface that is inclined with respect to the moving direction of the glass holder 20.

<Sheet Member that Guides Originals to Second Glass Member>In the vicinity of the reading position, it is desirable that the conveyance paths are linked smoothly, without a step, in order to prevent image degradation caused by a rattle of the original. For this reason, as illustrated in FIGS. 6A and 6B, a sheet member 27 is arranged in a delivery portion from the upstream conveyance path to the second glass member 17 such that a rear end of the original is smoothly guided from the upstream-side conveyance path onto the second glass member 17. The position of the sheet member is determined as the sheet member abuts on the second glass member 17. In a case where the glass moves toward the downstream side of the conveyance direction by virtue of the glass movement, the sheet member 27 does not abut on the second glass member 17 as illustrated in FIG. 6B. In this state, there is no member abutting on the second glass member 17, and no load is applied to the glass unit.

It is necessary to clean the second glass member 17 on a regular basis in order to suitably perform image reading and shading correction. For this purpose, the glass unit may have an easily detachably attachable state. However, in the reading position, the positioning is performed when the conveyance guide unit 25, the sheet member 27, or the like facing the second glass member 17 abuts on the second glass member 17 in order to guarantee the read image. For this reason, if the second glass member 17 is detached in this state, the abutting portions 18a and 18b of the conveyance guide unit 25 may be damaged or worn, or the sheet member 27 may be exfoliated or folded.

However, according to the present embodiment, it is possible to move the second glass member 17 to a position where the second glass member 17 does not abut on the sheet member 27 and the second glass member 17 and separate the conveyance guide unit 25 from the second glass member 17 as illustrated in FIG. 6B. For this reason, it is possible to easily detach the second glass member 17 from the apparatus body without considering damage on the abutting portions 18a and 18b of the guide member 18 or folding of the sheet member 27.

Furthermore, control may be performed such that the second glass member 17 moves to a position where the second glass member 17 does not abut on the sheet member 27 and the conveyance guide member 18 when it is detected that the apparatus body is powered off. By performing such control, it is possible to easily insert and extract the second glass member 17 while the second glass member 17 is reliably moved to a predetermined position.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2012-140853, filed Jun. 22, 2012, which is hereby incorporated by reference herein in its entirety.

What is claimed is:

1. An image reading apparatus comprising:
    a movable unit having a transparent member;
    a guide portion arranged to face the transparent member to guide a conveyed sheet;
    a reader portion configured to read an image on a sheet guided by the guide portion past the transparent member;
    an abutting portion that is provided on the guide portion and abuts on the movable unit;
    an actuating portion configured to move the movable unit in a direction along the surface of the transparent member; and
    an engaging portion provided on the movable unit and engaged with the guide portion such that the movable unit and the abutting portion are separated from each other as the movable unit is moved by the actuating portion.

2. The image reading apparatus according to claim 1, wherein the movable unit has a reference portion for use in shading correction, and
    the movable unit and the abutting portion are separated from each other by the engaging portion when the movable unit moves from a first position where the image on the sheet is read to a second position where the reference portion is read by the sensor.

3. The image reading apparatus according to claim 1, wherein a gap for passing the conveyed sheet is defined between the transparent member and the guide portion as the abutting portion abuts on the transparent member.

4. The image reading apparatus according to claim 1, wherein at least two engaging portions are arranged in a moving direction of the moving unit.

5. The image reading apparatus according to claim 1, wherein the guide portion has an engaged portion that is engaged with the engaging portion,
    one of the engaging portion and the engaged portion has an inclined surface that is inclined with respect to a movement direction of the movable unit.

6. The image reading apparatus according to claim 1, wherein the guide portion has a rotatable guide roller,
    the engaged portion is a shaft of the rotatable guide roller,
    the engaging portion has the inclined surface that is inclined with respect to the movement direction of the movable unit and contacts the shaft of the guide roller,
    as the movable unit moves away from a position where the conveyed sheet is read, the shaft of the guide roller is pressed by the inclined surface, and the guide portion moves such that the abutting portion is separated from the guide unit.

7. The image reading apparatus according to claim 1, wherein the guide portion is movably mounted and is biased by a pressing member toward the movable unit, and
    the engaging portion moves the guide portion to be separated from the movable unit against a biasing force of the pressing member.

8. The image reading apparatus according to claim 1, wherein the actuating portion has an eccentric cam rotated by receiving a driving force and
an abutting portion that is provided in the movable unit and
abuts on the eccentric cam.

9. The image reading apparatus according to claim 1, further comprising a sheet member configured to guide a sheet to the glass member.

* * * * *